(12) United States Patent
Hurlbut

(10) Patent No.: X6378
(45) Date of Patent: Feb. 14, 1831

(54) HATS,BODIES, BATS

(76) Inventor: Stephen Hurlbut

Stephen Hurlbut
Letters Patent

The Schedule referred to in these Letters Patent and making part of the same containing a description in the words of the said Stephen Hurlbut himself of his Improvement in making and constructing Batts for Hat Bodies

---

Be it known that I Stephen Hurlbut of Glastenbury in the County of Hartford and State of Connecticut have invented a new and useful improvement in making and constructing Bats for hat bodies and that the following is a full and exact description of the construction and operation of the said machine as invented or improved by me. First an Apron (N° 3,) attached to a common carding machine, which is made to vibrate by means of a Crank-pully (N° 6) belted from the Doffer (N° 2) A standard (N° 1) is affixed to a cross piece underneath the apron and by a limb (N° 12,) from the standard to which limb the crank-pully is attached, the size of the Bat is regulated it being necessary to lengthen the crank to increase the size and to shorten it to lessen the size. The apron is made to move round the frame in order to carry the web from the Doffer to the Former (N° 4, by means of a belt ascending from a pulley on the end of the Doffer (opposite the crank pully,) above to a double pully (N° 13) thence descending to the pully of the apron. The Former is a light wheel or table having a horizontal rotary motion and on the Former is a Roller (N° 5) The former (N° 4) is moved by a belt running on a pully attached to the under side of the Former, thence to another pully on the frame of the carding machine which last pully is carried by a belt on the shaft of the main cylinder The Roller is attached by a swivel in its centre to the arbor of the Former, and its outer or extreme end is secured to the frame of the carding machine by means of a swivel and wire. The operation of the machine is as follows. The web is received from the Doffer of a common carding machine upon the Apron, It is carried by the Apron to the Former and by the vibratory motion of the apron the web is crossed as it is received between the Former and the Roller. The variation in thickness of the bat for the formation of the body must be regulated by the feed of the carding machine. The size of the bat for the formation of of the body is regulated by a limb from the Standard of the Apron, to which there is a crank pulley. When the bat is completed it is torn from the circumference of the centre, gradually rolled over, and following the Former through one of its evolutions is taken off without stopping the Machinery. The bat is then divided into three equal parts which form three hat bodies. My claim for a patent is to the whole of the foregoing description attached to the Carding Machine and for crossing the webbing and making the bat.

Witnesses                                        Stephen Hurlbut

Thaddeus Wells

Gideon Wells

Exd

CJW.